Patented Mar. 7, 1950

2,499,361

UNITED STATES PATENT OFFICE 2,499,361

OXYALKYLATED PHENOL-ALDEHYDE DIOLS AND DERIVATIVES THEREOF

Melvin De Groote, University City, and Bernhard Keiser, Webster Groves, Mo., assignors to Petrolite Corporation, Ltd., Wilmington, Del., a corporation of Delaware No Drawing. Application May 31, 1947, Serial No. 751,626

15 Claims. (Cl. 260—410.5)

This invention relates to new materials or new compositions of matter consisting of oxyalkylated derivatives of diphenylolmethanes prepared from certain phenols and aldehydes, to certain fractionally and totally esterified forms of such oxyalkylated derivatives, and to methods for their preparation. To come within this invention, a product must have the required composition and must be surface-active and hydrophile, i. e., it must be water-soluble, water-dispersible, or self-emulsifiable. Products of the kind disclosed and claimed herein are themselves useful in various arts. In addition, they are useful as intermediates in the preparation of other products, as will be mentioned below.

Our invention requires first the preparation of diphenylolmethanes from certain aldehydes and phenols, in the proportions and under the conditions set out in detail below; and the subsequent oxyalkylation of such parent compounds by the use of certain oxyalkylating agents to produce a principal embodiment of our invention. Such oxyalkylated products are contemplated for use in various arts. They are also useful as intermediates in preparing a second principal embodiment of our invention. They are further useful as intermediates in the preparation of certain derivatives not included in the present invention.

The reagents of this invention may be visualized as substituted methanes, in which two of the four methane carbon valences are satisfied by phenolic residues of specified composition; one of the two remaining positions is occupied by hydrogen; and the last position is occupied either by hydrogen or by a hydrocarbon radical, whether of the alkyl, aryl, aralkyl, acyclic, cyclic, or alicyclic type, depending upon the nature of the aldehydic reactant used. The reagents may likewise be easily visualized as consisting of two modified phenolic residues connected by a methylene or a mono-substituted methylene bridge.

In our reagents, the molecule contains two residues derived from certain di-functional monocyclic and monohydric phenols. Di-functional (di-reactive) phenols, to be suitable as reactants here, must contain one hydrocarbon substituent in the 2,4,6 position. Such hydrocarbon substituent may contain only 1 carbon atom.

Phenolic bodies are widely used in resinification processes. In such reaction, the 2,4, and 6 positions of the phenolic ring (numbering from the phenolic hydroxyl group as occupying position 1) are the reactive positions. Since these three positions are full equivalents in such reactions, we shall refer to them herein as the 2,4,6 position, meaning that any one of them is equally intended. (It should be distinctly understood that we do not consider our reagents to be resins, however.) Where all three such positions are occupied by hydrogen, they are obviously all three available in such reactions; and the phenol is termed tri-functional or tri-reactive. Tri-functional phenols are not usable as phenolic reactants herein. Mono-functional (mono-reactive) phenols are likewise not included as usable reactants to produce our reagents.

The aldehydic reactant is present for the purpose of supplying the connecting bridge or link between two molecules of the phenol. The proportion of aldehydic reactant is carefully controlled, so as to produce a maximum amount of diphenylolmethane. We have found that if one uses 1 mole of aldehyde for 2 moles of phenol, i. e., the theoretical proportions of reactants, the reaction is inclined to be somewhat short of complete. We have therefore found it advisable to use slightly larger than theoretical proportions of aldehydic reactant, e. g., 1.05 or possibly as much as 1.10 moles of aldehyde for 2 moles of phenol. An appreciably larger proportion of the aldehydic reactant should not be employed, because it is conducive to the formation of molecules containing more than 2 phenolic nuclei each; and these are distinctly not included within the scope of our invention. It appears, however, that some slight excess of aldehyde, of the order stated, is desirable. If a minor proportion of some product containing 3 phenolic nuclei in the molecule happened to be formed in the preparation of our reagent, its presence would not be detrimental to such product's use in the applications stated below. Such impure or, rather, technically pure product is still to be considered as coming within our invention. The same is true if any uncombined excess of phenol happens to be present.

Use of an appreciably smaller ratio of aldehyde to phenol than 1 to 2 merely results in incomplete combination of the phenol, the amount remaining uncombined contributing little or nothing to the value of the product and at the same time raising its cost. Therefore, reactant proportions should be quite closely adhered to, and should be of the order of those just recited above.

Di-functional phenols are characterized by the presence of only two positions reactive in resinification processes. In other words, one of the three otherwise reactive positions mentioned above is occupied by a substituent of some character. For example, if the substituent occupies position 2 or position 6 (numbering from the hydroxyl group as in position 1), substitution is ortho; and only positions 4 and 6 or 2 and 4, respectively, are available for participation in reactions of that type. If position 4 is occupied, substitution is para; and only positions 2 and 6 are available. In general, para-substituted phenols are more readily procurable commercially and command lower prices than ortho isomers. For these reasons, and also because in some instances we have found the para isomers to produce superior reagents, we prefer to employ such para-substituted phenols as reactants. However, it should be clearly understood that, for the purpose of producing the reagents of this invention, the ortho and the para isomers are full equivalents.

Such para di-functional phenols are sometimes prepared from raw materials which contain methyl groups in either or both positions 3 and 5 (the meta position). Since such 3,5 position is not affected by reactions of the kind just discussed above, we specifically include di-functional phenols prepared from meta-cresol or 3,5 xylenol (i. e., di-functional phenols in which either or both the 3 and 5 positions are occupied by methyl groups) within the class of raw materials for producing our reagents.

Mixtures of the di-functional phenols named below may be employed to produce our reagents, instead of a single member of the specified class.

To be acceptable for use herein, a di-functional phenol must contain a substitutent in the 2,4,6 position, which substituent is a hydrocarbon radical. Such hydrocarbon radical may contain only 1 carbon atom, i. e., it must be the methyl radical. It may contain in addition a methyl radical in either or both the 3 and the 5 positions.

The phenols used as reactants to prepare our reagents are specified to be monocyclic phenols, in the sense that they do not contain a condensed or fused ring. The naphthols are specifically excluded from the present application. Our phenols are also required to be monohydric, i. e., they contain only one phenolic hydroxyl group per molecule.

In our products, both phenolic hydroxyl groups present in the parent diphenylolmethane, as prepared from a di-functional phenol of specified type and an aldehyde, have been replaced by a residue obtained from an alpha-beta low molal alkylene oxide. The alkylene oxides which we may use in preparing our reagents are limited to those containing 4 carbon atoms or less. They consist of ethylene oxide, propylene oxide, butylene oxide, glycide, and methylglycide. Glycide may be considered to be hydroxypropylene oxide; and methylglycide, hydroxybutylene oxide.

Such alkylene oxides react with various substances, including phenols, to introduce one or more divalent alkyleneoxy groups, i. e., ethyleneoxy, —$C_2H_4O$—; propyleneoxy, —$C_3H_6O$—; butyleneoxy, —$C_4H_8O$—, or generally, —$C_nH_{2n}O$—; or, in the case of glycide and methylglycide, hydroxypropyleneoxy (—$C_3H_5(OH)O$—) or hydroxybutyleneoxy (—$C_4H_7(OH)O$—), into the phenol molecule. Such alkylene oxide residue is interposed between the phenolic hydroxyl group's oxygen atom and its hydrogen atom. The result of this reaction is to convert the phenolic hydroxyl group into a glycol or hydroxylated glycol radical, one alcoholic hydroxyl group of which has been etherified with the phenolic residue, and the other or others are free to participate in any subsequent desired reactions. Depending upon the proportion of alkylene oxide available and the conditions under which reaction is conducted, it is possible to introduce from 1 to as many as 60 or more alkyleneoxy units at each phenolic hydroxyl group, in this manner. In the present invention, we desire to specify that from 1 to 60 such units may be present for each original phenolic hydroxyl group in our reagents, so long as they retain certain specified properties stated in detail below.

Because glycide and methylglycide are so infrequently employed, we shall confine our subsequent remarks below essentially to ethylene oxide, propylene oxide, and butylene oxide. It must be always remembered that when we speak henceforth of alkylene oxide residues, or illustrate our statements by references to one or more of the three non-hydroxylated members of our class, we none the less always include glycide and methylglycide as full equivalents thereof. When we refer to glycols or polyglycol radicals herein, it is to be understood that hydroxyglycol or hydroxypolyglycol radicals are meant if the reactant is glycide or methylglycide. Glycide is so reactive that its use is not recommended, because of the hazard involved. It nevertheless comes within the purview of our invention. Mixtures of all our alkylene oxide reactants may be used, if desired, instead of any single one of them.

In our simpler products, then, the two phenolic hydroxyl groups of a diphenylolmethane have been converted into two glycol or polyglycol radicals having one free alcoholic hydroxyl group (in the case of glycide- and methylglycide-derived reagents, two or more) each. In our more complex reagents, such free alcoholic groups have been esterified, e. g., with a higher fatty acid, to produce fractional or total esters. Detailed consideration of this phase of our invention is deferred momentarily.

The radical or residue which appears in our reagents as a bridge or link between the two modified phenolic radicals discussed above, is obtained from a suitable reactive aldehyde containing not more than 8 carbon atoms. Such aldehyde may be aliphatic; it may be aromatic; or it may be cyclic. The simplest aldehydic reactant is formaldehyde; and because of its wide availability, low cost, and high reactivity in the present invention, we name it as our generally preferred reactant of this class. Its cyclic polymer, trioxane, may sometimes be employed to advantage. Its homologues, such as acetaldehyde or its polymer paraldehyde, propionaldehyde, butyraldehyde, and heptaldehyde, are obvious equivalents. Aromatic aldehydes like benzaldehyde are usable. Furfuraldehyde, representative of the class of heterocyclic aldehydes, is usable, etc. Obviously, where a material, although an aldehyde, possesses some more reactive functionality than its aldehydic character, it may not react as an aldehyde here, and hence may be unsuitable for use in preparing our reagents. Mixtures of suitable aldehydes containing less than 9 carbon atoms are usable to prepare our reagents.

To summarize the foregoing briefly, our reagents are prepared from diphenylolmethanes which have themselves been obtained from low molal aldehydes and certain di-functional phenols, but not from mono-functional or tri-functional phenols. If procurable commercially, such diphenylolmethanes may be purchased rather than prepared. Such diphenylolmethanes are then subjected to oxyalkylation by means of a low molal oxyalkylating agent, in which process from 1 to 60 alkyleneoxy residues are introduced at each phenolic hydroxyl group, between the oxygen and hydrogen atoms thereof. Such oxyalkylated diphenylolmethanes are themselves an important embodiment of our invention's reagents. Their fractional or total esters, particularly those of high molal monocarboxylic acids, constitute a second important embodiment of our reagents.

Our reagents may be illustrated by the following type formulas:

or

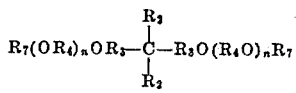

In the first formula, $R_1$ refers to a radical derived from a di-functional phenol in which the hydrocarbon substituent in the 2,4,6 position may possess only 1 carbon atom. The two $R_1$ radicals may be the same or they may be different. Each $R_1$ no longer possesses its original phenolic hydroxyl group, the latter having been replaced by residues obtained from alkylene oxide reactants and which possess terminal alcoholic hydroxyl groups, in free or esterified form.

In other words, the radicals $R_1$ may be further detailed as in the second formula shown, where they are seen to consist of the radicals

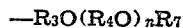

wherein $R_3$ is the phenolic nucleus containing a substituent hydrocarbon radical, as above defined; $R_4$ is an alkylene or hydroxyalkylene radical, either $-C_2H_4-$, $-C_3H_6-$, $-C_4H_8-$, $-C_3H_5(OH)-$, or $-C_4H_7(OH)-$; $n$ is a number between 1 and 60; and $R_7$ is either hydrogen or the acyl radical of a high molal or a low molal monocarboxylic acid, with the limitation that at least one of the two occurrences of $R_7$ must represent the acyl radical of a high molal monocarboxylic acid, if either is acyl, as explained further below. $R_2$ in both formulas may be either hydrogen or an organic radical containing 7 carbon atoms or less; but at least one occurrence must represent hydrogen. (Where both occurrences of $R_2$ represent hydrogen, formaldehyde was the parent aldehydic reactant. Where benzaldehyde was the aldehyde employed, the second $R_2$ would represent the $C_6H_5$ radical. If furfuraldehyde were the aldehyde used, the second occurrence of $R_2$ would represent the cyclic radical, $C_4H_3O$. If acetaldehyde were used, the second $R_2$ would represent the aliphatic radical, $CH_3$. These examples are illustrative.)

To detail this last generic formula still further, so as to show the phenolic residue in clearer fashion, the following formula is offered:

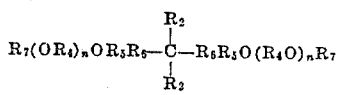

In this formula, one occurrence of $R_2$ represents hydrogen and the other occurrence represents either hydrogen or an organic radical, as before. $R_4$ is an alkylene radical or radicals each containing from 2 to 4 carbon atoms (and also containing a hydroxyl group if derived from glycide or methylglycide.) The $n$ occurrences of the alkyleneoxy radical $R_4O$ number between 1 and 60, for each occurrence of $n$ shown. $R_5$ is a hydrocarbon radical containing only 1 carbon atom and located in the 2,4,6 position of a parent di-functional phenol. $R_6$ is a monocyclic aromatic ring, which may contain a methyl group in either or both the 3 and 5 positions, so long as the phenol is di-functional. $R_7$ represents hydrogen or an acyl radical derived from a monobasic carboxylic acid, with the proviso that if either occurrence of $R_7$ represents an acyl radical, at least one such acyl radical must be that of a high molal monocarboxylic acid.

The level of oxyalkylation employed to produce satisfactory reagents will depend upon a number of factors. In all cases, however, the ultimate product must possess surface-activity and must be hydrophile, to come within our invention. Since ethylene oxide possesses the greatest oxygen-to-carbon ratio of the non-hydroxylated alkylene oxides which are usable, it will ordinarily require fewer moles of it to produce a required level of surface-activity than it would of butylene oxide, for example. For some purposes, however, it may be desirable to employ butylene oxide rather than ethylene oxide, in spite of the above fact. Sometimes an intermediate product may have a somewhat unsatisfactory surface-activity; but this is immaterial so long as the ultimate product, asserted to come within our invention, has the required surface-activity.

DIPHENYLOLMETHANE

Example 1

Mix 216 pounds of o-cresol (2 moles) with 85 pounds of 37% formaldehyde (1.05 mole), 4 pounds of concentrated hydrochloric acid, and 1.5 pounds of Nacconal NRSF (a product of National Aniline Co.) in a vessel equipped with a reflux condenser, stirrer, thermometer, and cooling coils. This material, as is well known, is a monoalkyl ($C_{10}$–$C_{20}$, principally $C_{12}$–$C_{14}$) benzene monosulfonic acid sodium salt. Heat to 80° C. where a mild exothermic reaction sets in, raising the temperature to 100–105° C. A thin creaminess is noted after 15–30 minutes of refluxing. Reflux for 1 hour; add 100 pounds of xylene as a solvent for subsequent oxyalkylation and also to facilitate removal of water from the reaction mass. Distill the water of solution and of reaction, with the xylene, using a trap arrangement which permits return of the xylene to the vessel, but removal of water as distilled. The resulting product, when solvent-free, is soft, tacky, xylene-soluble, and a clear amber color. Molecular weight determination indicates about 85–90% of our desired reagent is present in the product. The purity may be increased to about 95% or more by vacuum distillation.

DIPHENYLOLMETHANE

Example 2

Replace the o-cresol of the foregoing example with 1,3,4 xylenol. The resulting product, when solvent-free, has physical properties quite similar to those of the product of the preceding example.

DIPHENYLOLMETHANE

Example 3

Use 216 pounds of o-cresol, 75.6 pounds of butyraldehyde (molal ratio, 2 to 1.05), and 4 pounds of concentrated hydrochloric acid. Add the cresol and the hydrochloric acid to a vessel equipped as in Example 1, above. Raise the temperature to 150° C. Introduce the aldehyde slowly, the temperature gradually receding as water is formed, to 100–110° C. Reflux the mass for 1 hour, add 100 pounds of xylene, and then distill the water to a temperature of 150° C. This is essentially the procedure employed in U. S. Patent No. 2,373,058, dated April 3, 1945, to Silberkraus. The resultant product, when solvent-free, is soft, tacky, xylene-soluble, dark red in color, and clear. Molecular weight determination indicated that the product contained about 85% of our reagent. It may be purified by vacuum distillation to about 93% purity, if desired.

DIPHENYLOLMETHANE

*Example 4*

Use 216 pounds of o-cresol, 119.5 pounds of heptaldehyde (molal ratio, 2 to 1.05), 4 pounds of concentrated sulfuric acid, and 100 pounds of xylene. The aldehyde is added to the phenol and sulfuric acid, as above, adding the xylene just before starting to distill the water of reaction. The reaction is decidedly exothermic, the temperature rising rapidly to from 140 to 160° C. before beginning to fall rapidly with formation of water of reaction, to 100–110° C. The product in xylene solution is dark red and soft-to-fluid.

DIPHENYLOLMETHANE

*Example 5*

Use 1,3,4 xylenol, 244 pounds; heptaldehyde, 119.5 pounds (molal ratio, 2 to 1.05); concentrated sulfuric acid, 4 pounds; and xylene, 100 pounds. Proceed as in Example 3, above. Heating is stopped at 130° C., the exothermic reaction carrying the temperature to 150° C. as the aldehyde is added, before beginning to drop with formation of water of reaction. The water is distilled as before. The product, when solvent-free, is very soft-to-fluid, reddish-black in color, clear, and xylene-soluble.

In general, preparation of the diphenylolmethane may be accomplished merely by reacting the phenol and the aldehyde in absence of added inert solvent. However, if the use to which the final product is to be put does not rule out the use of such solvents, they are often employed to advantage, as shown by the foregoing examples. For example, xylene or high-boiling aromatic petroleum solvent may be included in the reaction mass to reduce its viscosity. On completion of the reaction, it facilitates removal of the water of solution (if the aldehyde was used in aqueous solution) and the water of reaction. We prefer to employ such solvent at this point in the preparation of such of our reagents as are ultimately to be used as demulsifiers, as above noted, because the finished demulsifying agent will probably be required to contain a viscosity-reducing solvent anyway, if it is to be used commercially.

Having prepared the parent diphenylolmethanes by the foregoing or other procedures—details of such preparation being well known and also being shown in the examples above, or the materials having been purchased, if obtainable—we next oxyalkylate the material.

Oxyalkylation of such diphenylolmethanes, as above stated, results in the interposition of an alkyleneoxy group or multiples thereof between the original phenolic hydroxyl oxygen atom and its companion hydrogen atom; and the conversion of such original phenolic hydroxyl groups into alcoholic hydroxyl groups. Because such oxyalkylation procedure introduces oxygen atoms into the molecule being treated, in the form of ether linkages, it generally confers increasing water-solubility on such molecule. Particularly, in such cases, it confers increasing water-solubility by small increments, so that substantially any desired level of water-solubility, water-dispersibility, or self-emulsifiability may be conferred simply by controlling the number of alkyleneoxy groups so introduced. For different purposes, it may be desired to have higher or lower levels of oxyalkylation.

For reagents which are effective as demulsifiers for crude oil emulsions of the water-in-oil type, we prefer to employ a relatively high level of oxyalkylation, and prefer to employ ethylene oxide to achieve it. In using ethylene oxide, we have found that in some cases surface-activity and self-emulsifiability begin to appear when there has been added about half as much ethylene oxide as there is diphenylolmethane present, by weight. For some purposes, where hydrophile qualities are desired, but with low water-solubility, such result might be achieved by using smaller proportions of ethylene oxide or by employing some higher alkylene oxide, e. g., butylene oxide, which has a smaller oxygen-to-carbon ratio, and hence confers less water-solubility per molecule added than does ethylene oxide.

Oxyalkylation is a well known procedure. The alkylene oxide is added, either continuously or batchwise, in gaseous or liquid form, to the liquid or molten diphenylolmethane, at a temperature at which the alkylene oxide will be absorbed. While the reaction is an exothermic one, it is usually required to heat the parent diphenylolmethane at the beginning of the reaction, and sometimes throughout it, to temperatures generally lying between 50° and 250° C. Reaction is preferably effected in a closed vessel, capable of withstanding the pressures developed, to prevent loss of alkylene oxide. Pressures are sometimes low, of the order of 10 to 20 p. s. i. gauge; but in some instances, especially in more exhaustive oxyalkylation, pressures of the order of 100 p. s. i. or even 1,000 p. s. i., may be encountered. In some instances, the reaction is so vigorous that cooling must be practised, or the stirring rate must be reduced, to reduce effectiveness of contact and consequent rate of reaction.

Catalysts are preferably employed in this reaction; and alkaline catalysts are more desirable than acidic catalysts. Caustic soda, alkali carbonates, alkali alcoholates like sodium methylate, alkali soaps, etc., may be so used. The amounts employed usually lie between 0.2 and 2% by weight of the diphenylolmethane.

In all instances the proportion of alkylene oxide employed is sufficient to produce self-emulsifiability of the diphenylolmethane. In the case of ethylene oxide, about 0.5 to 2 moles per mole of diphenylolmethane may be required to produce incipient water-dispersibility and surface-activity. Addition of alkylene oxide may be continued to any level desired, for the units of alkylene oxide continue to interpose themselves between the oxygen atom and the hydrogen atom of the free hydroxyl groups present (the first such unit added to each original phenolic hydroxyl group transforming it into an alcoholic hydroxyl group).

If the oxyalkylated diphenylolmethane is to be used as an intermediate in the preparation of a fractional or total ester, the influence of the esterifying acid on the surface-activity of the resulting ester must be considered. For instance, if one employs an oxyalkylated diphenylolmethane which is itself only marginally surface-active, and esterifies it with a monocarboxylic acid having, for example, 18 carbon atoms, it is possible that the effect of such esterifying acid will be such as to remove the resulting ester from the class of reagents acceptable in our invention, because such ester may exhibit negligible surface-activity. In another case, the intermediate oxyalkylated diphenylolmethane employed in such esterification may show undesirably high and almost true water-solubility; but the effect of the high molal esterifying acid would tend to reduce the water-solubility, and the resulting ester might show more desirable surface-activity for that purpose.

One method of varying the oxyalkylation level is to add a small proportion of alkylene oxide, substantially sufficient to convert only one of the two phenolic hydroxyl groups to an alcoholic hydroxyl group; then to esterify this alcoholic group with the desired high molal acid; and then to revert to oxyalkylation to introduce sufficient alkylene oxide to solubilize the fractional ester to the desired level.

Surface-activity of the reagents of our invention is determinable quantitatively by finding the surface- or interfacial tension of dilute aqueous dispersions, e. g., by means of a DuNouy tensiometer or dropping pipette, etc. A value considerably lower than that of the solution water should be found in dilutions of 1% and less, if the dissolved substance is surface-active. If it were truly dissolved in the water, the values would approximate that of water. Unless the reagent has been solubilized at least to the extent that a dilute aqueous dispersion, e. g., of 0.5% to 5% concentration, exhibits substantial homogeneity for periods of from 30 minutes to 2 hours, it is usually not possible to make a satisfactory measurement of its surface- or interfacial tension. The acceptability of a reagent in our invention is determined by the fact that it has at least sufficient surface-activity to produce an aqueous dispersion of 0.5% to 5% concentration which is substantially stable or at least semi-stable for 30 minutes to 2 hours. At the lower limit of acceptability, therefore, it may be impracticable to make a quantitative measurement of such surface-activity, as just noted. In the present instance, we apply the word "hydrophile" to means products which exhibit at least such minimum surface-activity as shown by the fact that they are capable of producing, with water, dispersions which are at least of such minimum stability. Insufficiently solubilized reagents are consequently excluded from the scope of our invention.

As examples of methods for preparing oxyalkylated diphenylolmethanes of the present class, we submit the following:

OXYALKYLATED DIPHENYLOLMETHANE

*Example 1*

The xylene-free product of Example 1, Diphenylolmethane, above (at least 85% pure), 275 pounds is mixed with 88 pounds of xylene, and 5.5 pounds of sodium methylate. Ethylene oxide is added in 100 pound portions. On addition of the first 100 pounds, there was a temperature increase to about 140° C. from about 80° C. (to which the vessel and contents had been previously heated). The maximum pressure observed was about 65 p. s. i. gauge. Within an hour, a light-yellow oil was produced, which, although containing xylene, produced a milky aqueous dispersion of fair stability. Addition of a second portion of 100 pounds of ethylene oxide required slightly longer time, slightly higher temperature and slightly higher pressure; and the product produced a somewhat more stable aqueous dispersion. A third, a fourth and a fifth portion of 100 pounds each of ethylene oxide were introduced. Adsorption was progressively slower. Water-dispersibility of the product improved regularly with added ethylene oxide.

OXYALKYLATED DIPHENYLOLMETHANE

*Example 2*

The diphenylolmethanes of Examples 2 to 5, Diphenylolmethane, above, were substituted in the oxyalkylation procedure just recited in Example 1, above.

OXYALKYLATED DIPHENYLOLMETHANE

*Example 3*

The diphenylolmethanes of Examples 1 to 5, Diphenylolmethane, above, were employed in oxyalkylation procedures like that of Example 1, immediately above, except that propylene oxide or butylene oxide was used instead of ethylene oxide.

As previously stated, one of the preferred embodiments of our reagents is the esters, both fractional and total, with high molal monocarboxylic acids. Such esterification is commonly conducted using the free high molal acid, with small proportions of conventional esterification catalysts, e. g., aromatic sulfonic acids, alkylated aromatic sulfonic acids, alkyl phosphoric acids, hydrogen chloride gas, etc., and heating to temperatures somewhat above 100° C. Completeness of the reaction may be followed in such cases by noting the amount of water of reaction which is distillable; or it may be followed by determining the reduction in free carboxyl group. For fractional esters, of course, the proportion of esterifying acid must be limited to the molal proportion required to esterify only a part of the alcoholic hydroxyl groups present. It has already been stated that functional equivalents of the free high molal acids may be employed in this esterification reaction.

FRACTIONAL HIGH MOLAL ESTER OF OXYALKYLATED DIPHENYLOLMETHANE

*Example 1*

One mole of the oxylated diphenylolmethane produced in "Oxyalkylated diphenylolmethane, Examples 1 to 3," above, (at least 85% pure) is reacted with an equi-molar proportion (282 parts) of oleic acid, in xylene solution. After refluxing 1 hour, the vessel containing the mixture is fitted with a side-arm trap and is heated to distill the approximately 18 parts of water produced in the esterification.

FRACTIONAL HIGH MOLAL ESTER OF OXYALKYLATED DIPHENYLOLMETHANE

*Example 2*

Repeat Example 1, immediately above, except use 298 parts of ricinoleic acid as the esterifying acid.

FRACTIONAL HIGH MOLAL ESTER OF OXYALKYLATED DIPHENYLOLMETHANE

Example 3

Repeat Examples 1 and 2, immediately above, except use 280 parts of lineolic acid or 278 parts of linolenic acid as the esterifying acid.

FRACTIONAL HIGH MOLAL ESTER OF OXYALKYLATED DIPHENYLOLMETHANE

Example 4

Repeat Examples 1 to 3, immediately preceding, except use approximately 275 parts of the mixed fatty acids derived from coconut oil as the esterifying acid.

FRACTIONAL HIGH MOLAL ESTER OF OXYALKYLATED DIPHENYLOLMETHANE

Example 5

Repeat Examples 1 to 4, immediately above, except use approximately 280 parts of soyabean fatty acids as the esterifying acid.

When one employs twice as many moles of high molal esterifying acid as of oxyalkylated diphenylolmethane (assuming non-hydroxylated alkylene oxides were used), in the above esterification procedure, total esters are formed. Such total esterification reactions are even easier to conduct than those employed to produce fractional esters, because the presence of excess esterifying acid is not important. It may be removed at the end of the reaction, or it may be allowed to remain in the mass, if its presence is not undesirable in the projected use of the total ester. Employment of the methyl or ethyl ester of the esterifying acid is quite practicable here. The free acids, their acyl chlorides, their anhydrides, etc., may be equally well employed as in the case of the preparation of the fractional esters above.

TOTAL HIGH MOLAL ESTER OF OXYALKYLATED DIPHENYLOLMETHANE

Example 1

Repeat the procedure of "Fractional high molal ester of oxyalkylated diphenylolmethane, Examples 1 to 5," above, except use twice as much of the fatty acid in each case. (Note that four or more times as much high molal acid as in the preceding examples would be required to produce total esters from oxyalkylated diphenylolmethanes prepared from glycide or methylglycide.

TOTAL HIGH MOLAL ESTER OF OXYALKYLATED DIPHENYLOLMETHANE

Example 2

Repeat Example 1, immediately above, except use an equivalent amount of the respective acyl chloride, instead of the free fatty acid in each case. Note that hydrogen chloride, not water, will be the other product of the esterification reaction here.

So long as one of the alcoholic hydroxyl groups of the oxyalkylated diphenylolmethane has been esterified with a high molal monocarboxylic acid, as above illustrated, the remaining such hydroxyl group or groups may be esterified with a low molal monocarboxylic acid, containing 7 carbon atoms or less, to produce a mixed ester. The following examples embody this phase of our reagents.

MIXED ESTER OF OXYALKYLATED DIPHENYLOLMETHANE

Example 1

The fractional esters produced in "Fractional high molal ester of oxyalkylated diphenylolmethane, Examples 1 to 5," above, are heated with proportions of either acetic acid, hydroxyacetic acid, lactic acid, or butyric acid, sufficient to esterify the remaining free alcoholic hydroxyl groups present in such fractional esters. An equivalent amount of water of esterification is distilled off, after suitable refluxing; and mixed esters of said oxyalkylated diphenylolmethanes are the resulting product.

If a total ester containing the residue of a hydroxylated monocarboxylic acid is desired, it is preferable to produce the fractional ester of any non-hydroxylated acid employed; and to use the latter in the second esterification step. This avoids any possibility of reaction between the hydroxyl group of the hydroxylated acid and the carboxyl group of the other acid, in preference to reaction between the free alcoholic hydroxyl group of the oxyalkylated diphenylolmethane and the non-hydroxylated acid's carboxyl group. For example, if ricinoleic acid and a low molal non-hydroxylated acid are to be esterified, the ricinoleic acid is preferably reacted last.

In the foregoing discussion, no consideration has been given the thought that symmetrical and unsymmetrical forms of oxyalkylated diphenylolmethane may be prepared. For example, minimum oxyalkylation may be conducted, so as to introduce a total of two moles of alkylene oxide, which convert the two phenolic hydroxyl groups to alcoholic hydroxyl groups. Then, one of the alcoholic hydroxyl groups may be blocked by reacting the partially oxyalkylated product with an acid, e. g., a high molal monocarboxylic acid, to produce a fractional ester. Such fractional ester may then be oxyalkylated further, all of the additional alkylene oxide being added at the other or free alcoholic hydroxyl group. In such case, the esterified hydroxyl group position would possess only one alkylene oxide residue; all others introduced would be located at the other alcoholic hydroxyl group position.

If desired, this same procedure may be applied, but more alkylene oxide introduced in the first oxyalkylation step. In such instance, both alcoholic hydroxyl groups would receive a number of alkylene oxide residues. Esterification at one of such two positions would then prevent any further addition of alkylene oxide there; and any further oxyalkylation must consequently take place at the other position. This latter position would then have more alkylene oxide residue than the first and esterified position; and the product would likewise be unsymmetrical.

Where all oxyalkylation takes place before any esterification, in a single preliminary operation, distribution of alkylene oxide residues between the alcoholic hydroxyl positions will be uniform if the two phenolic nuclei are identical; and symmetrical oxyalkylated esters will result on subsequent esterification.

Materials of the kind herein disclosed are useful in many arts. They may be used as wetting, detergent and leveling agents in the laundry, textile and dyeing industries; as wetting agents and detergents in the acid-washing of fruit and in the acid-washing of building stone and brick; as a wetting agent and spreader in the application of asphalt in road building and the like; as a constituent of soldering flux preparations; as a flotation agent in the flotation separation of various minerals; for flocculating and coagulating negatively-charged particles from various aqueous suspensions such as sewage, coal-washing waste water, various trade wastes, and the like; as germicides and insecticides; as emulsifiers for cosmetics, spray oils, water-repellent textile finishes, etc. The aforementioned uses are by no means exhaustive as to industrial uses. The most important use of our new composition of matter is as a demulsifier for dehydrating water-in-oil emulsions, and more specifically emulsions of water or brine in crude petroleum.

The chemical reagents herein described are also particularly desirable for use as break inducers in the doctor treating procedure for sweetening gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, like hydrochloric acid. As to this use, see U. S. Patent No. 2,233,383, dated February 24, 1941, to De Groote and Keiser. Similarly, some members are effective as surface tension depressants or wetting agents in the working of depleted oil-bearing strata by flooding, in secondary recovery operations. As to these last named uses, see U. S. Patent No. 2,226,119, dated December 24, 1940, to De Groote and Keiser.

We have prepared a number of representative oxyalkylated diphenylolmethanes and esters thereof, as described herein. We have tested such representative oxyalkylated diphenylolmethane products and their esters, as herein described, and have found them to be effective demulsifiers for oil-field emulsions of the water-in-oil type. We have additionally determined that such oxyalkylated products and their esters are valuable for purposes where surface-active agents are conventionally employed. We have also determined that the oxyalkylated products and their esters herein described can be used as intermediates for the manufacture of more complicated derivatives.

While the examples show a number of representative usable phenols, it may be well to describe our preferred trifunctional phenolic reactants here. These are prepared from the phenolic compositions present in or derived from the oils extracted from the anacardium genus of the anacardiaceae family. Cashew nutshell liquid is described as consisting of about 90% anacardic acid, $C_{22}H_{32}O_3$, and 10% cardol, $C_{32}H_{52}O_4$, with very small fractional percentages of other materials. Anacardic acid is generally accepted to be:

Pyrolytic distillation causes conversion into phenols. Our reagents may be obtained from cashew nutshell liquid, anacardol (3-pentadecadienylphenol), cardanol (dihydroanacardol or 3-pentadecenylphenol), and hydrogenated cardanol (dihydrocardanol or tetrahydroanacardol or 3-pentadecylphenol). Commercially, these products appear on the market in one of three forms: cardanol, treated cashew nutshell liquid, and hydrogenated cardanol.

As an example of a diphenylolmethane prepared from one such tri-functional phenol, and suitable for subsequent oxyalkylation, the following directions may be given: Use cardanol, 576 grams; formaldehyde (37%), 81 grams (molal ratio, 2 to 1); concentrated hydrochloric acid, 4 grams; Nacconal NRSF (a product of National Aniline Co.), 1.5 grams. Proceed as in Example 1, "Diphenylolmethane," above, except that the xylene is added just before water is distilled. The product, when solvent-free, is dark red, soft or semi-fluid, and xylene-soluble.

Attention is directed to the fact that the present application is one of a series, Serial Nos. 751,600, 751,601, 751,603, 751,604, 751,614, 751,615, 751,616, 751,618, 751,621, 751,622, 751,625, 751,627, 751,628, and 751,629, all filed of even date, and all relating to kindred subject-matter. Applications Nos. 751,614, 751,615, 751,616, 751,618, 751,621 and 751,622 are now abandoned.

Having thus described our invention, what we claim as new and desire to secure by Letters Patent is:

1. A surface-active oxyalkylated derivative of a diphenylolmethane having the formula

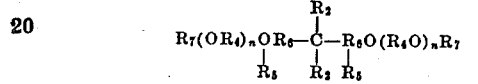

wherein one occurrence of $R_2$ represents hydrogen and the other occurrence represents a member of the class consisting of hydrogen and organic radicals having 7 carbon atoms or less; $R_4$ is a member of the class consisting of alkylene radicals and hydroxyalkylene radicals and contains 4 carbon atoms or less; $R_6$ is a monocyclic phenolic nucleus ortho-linked to the carbon atom C; $R_5$ is a methyl radical and is located in the para position of the phenolic nucleus $R_6$; $R_7$ is a member of the class consisting of hydrogen, acyl radicals of monocarboxylic acids having from 8 to 32 carbon atoms, and acyl radicals of monocarboxylic acids having less than 8 carbon atoms, with the proviso that if either occurrence of $R_7$ represents an acyl radical, at least one such occurrence must represent the acyl radical of a monocarboxylic acid having from 8 to 32 carbon atoms; and $n$ is a number between 1 and 60; with the final proviso that said derivative, in absence of water-insoluble solvents, is surface-active to the extent that it is capable of forming at least a semi-stable aqueous dispersion in 0.5% to 5% concentration, said surface-activity being due to oxyalkylation in the phenolic hydroxyl position.

2. The product of claim 1, wherein one occurrence of $R_2$ represents hydrogen and the other occurrence of $R_2$ represents an aliphatic radical.

3. The product of claim 1, wherein both occurrences of $R_2$ represent hydrogen.

4. The product of claim 1, wherein both occurrences of $R_2$ represent hydrogen, and $R_4$ is the ethylene radical $C_2H_4$.

5. The product of claim 1, wherein both occurrences of $R_2$ represent hydrogen; $R_4$ is the ethylene radical $C_2H_4$; and both occurrences of $n$ represent the same number.

6. The product of claim 1, wherein one occurrence of $R_7$ represents hydrogen and the other occurrence of $R_7$ represents the acyl radical of a monocarboxylic acid containing from 8 to 32 carbon atoms.

7. The product of claim 1, wherein one occurrence of $R_2$ represents hydrogen; the other occurrence of $R_2$ represents an aliphatic radical; one occurrence of $R_7$ represents hydrogen; and the other occurrence of $R_7$ represents the acyl radical of a monocarboxylic acid containing from 8 to 32 carbon atoms.

8. The product of claim 1, wherein both occurrences of $R_2$ represent hydrogen; one occurrence of $R_7$ represents hydrogen; and the other occurrence of $R_7$ represents the acyl radical of a monocarboxylic acid containing from 8 to 32 carbon atoms.

9. The product of claim 1, wherein both occurrences of $R_2$ represent hydrogen; $R_4$ is the ethylene radical $C_2H_4$; one occurrence of $R_7$ represents hydrogen; and the other occurrence of $R_7$ represents the acyl radical of a monocarboxylic acid containing from 8 to 32 carbon atoms.

10. The product of claim 1, wherein both occurrences of $R_2$ represent hydrogen; $R_4$ is the ethylene radical $C_2H_4$; one occurrence of $R_7$ represents hydrogen; the other occurrence of $R_7$ represents the acyl radical of a monocarboxylic acid containing from 8 to 32 carbon atoms; and both occurrences of $n$ represent the same number.

11. The product of claim 1, wherein one occurrence of $R_7$ represents the acyl radical of a monocarboxylic acid containing from 8 to 32 carbon atoms, and the other occurrence of $R_7$ represents the acyl radical of a monocarboxylic acid containing from 1 to 32 carbon atoms.

12. The product of claim 1, wherein one occurrence of $R_2$ represents hydrogen; the other occurrence of $R_2$ represents an aliphatic radical; one occurrence of $R_7$ represents the acyl radical of a monocarboxylic acid containing from 8 to 32 carbon atoms; and the other occurrence of $R_7$ represents the acyl radical of a monocarboxylic acid containing from 1 to 32 carbon atoms.

13. The product of claim 1, wherein both occurrences of $R_2$ represent hydrogen; one occurrence of $R_7$ represents the acyl radical of a monocarboxylic acid containing from 8 to 32 carbon atoms; and the other occurrence of $R_7$ represents the acyl radical of a monocarboxylic acid containing from 1 to 32 carbon atoms.

14. The product of claim 1, wherein both occurrences of $R_2$ represent hydrogen; $R_4$ is the ethylene radical $C_2H_4$; one occurrence of $R_7$ represents the acyl radical of a monocarboxylic acid containing from 8 to 32 carbon atoms; and the other occurrence of $R_7$ represents the acyl radical of a monocarboxylic acid containing from 1 to 32 carbon atoms.

15. The product of claim 1, wherein both occurrences of $R_2$ represent hydrogen; $R_4$ is the ethylene radical $C_2H_4$; one occurrence of $R_7$ represents the acyl radical of a monocarboxylic acid containing from 8 to 32 carbon atoms; the other occurrence of $R_7$ represents the acyl radical of a monocarboxylic acid containing from 1 to 32 carbon atoms; and both occurrences of $n$ represent the same number.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 1,990,985 | Fonrobert et al. | Feb. 12, 1935 |
| 2,330,474 | De Groote | Sept. 28, 1943 |
| 2,331,265 | Coleman et al. | Oct. 5, 1943 |
| 2,385,970 | De Groote | Oct. 2, 1945 |